May 10, 1960 O. P. STORCH 2,936,079
KNOCK-DOWN PARALLELOGRAMMIC DISPLAY DEVICE
Filed Aug. 7, 1959 3 Sheets-Sheet 1

INVENTOR:
OTTO P. STORCH
BY
Frederick Breitenfeld
ATTORNEY

May 10, 1960  O. P. STORCH  2,936,079
KNOCK-DOWN PARALLELOGRAMMIC DISPLAY DEVICE
Filed Aug. 7, 1959  3 Sheets-Sheet 2
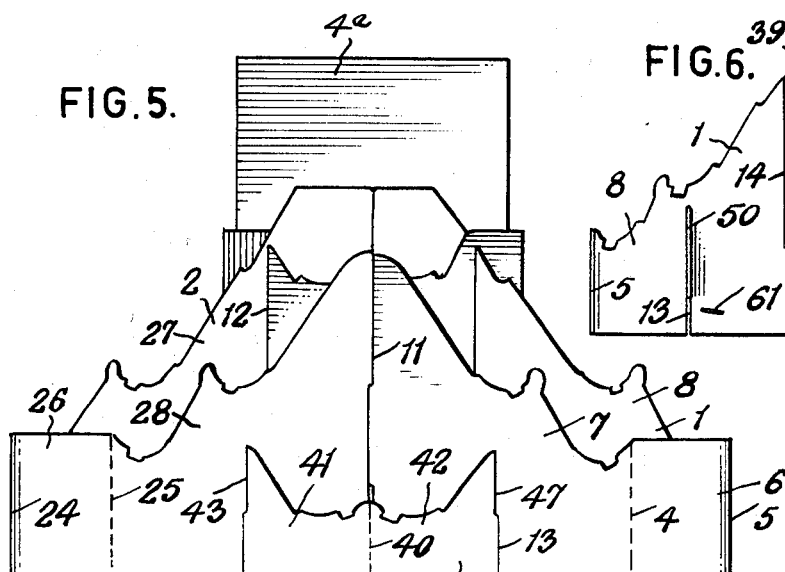
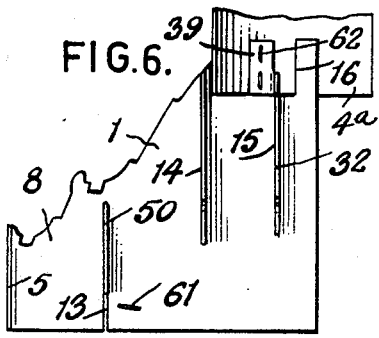
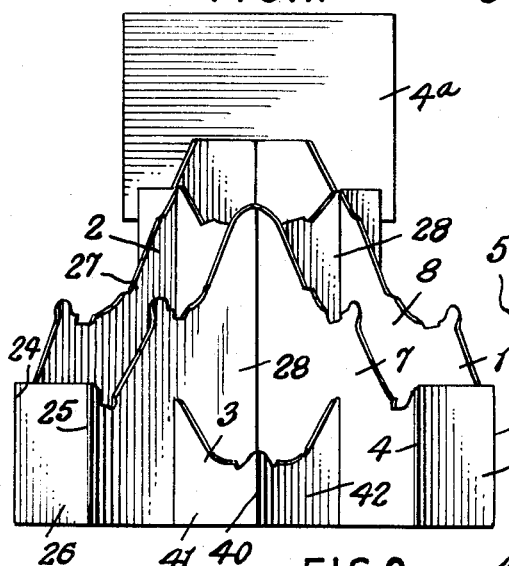
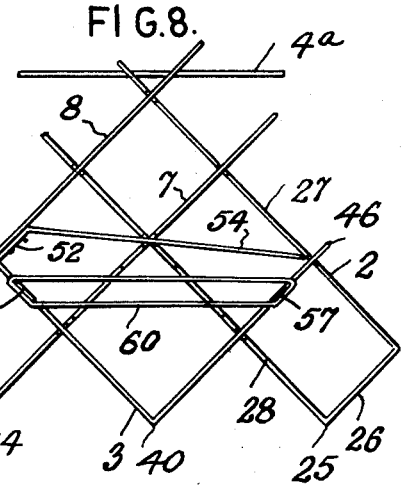
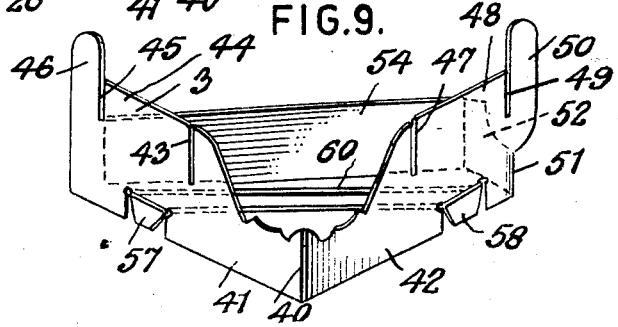
INVENTOR:
OTTO P. STORCH
BY
Frederick Breitenfeld
ATTORNEY May 10, 1960 O. P. STORCH 2,936,079
KNOCK-DOWN PARALLELOGRAMMIC DISPLAY DEVICE
Filed Aug. 7, 1959 3 Sheets-Sheet 3
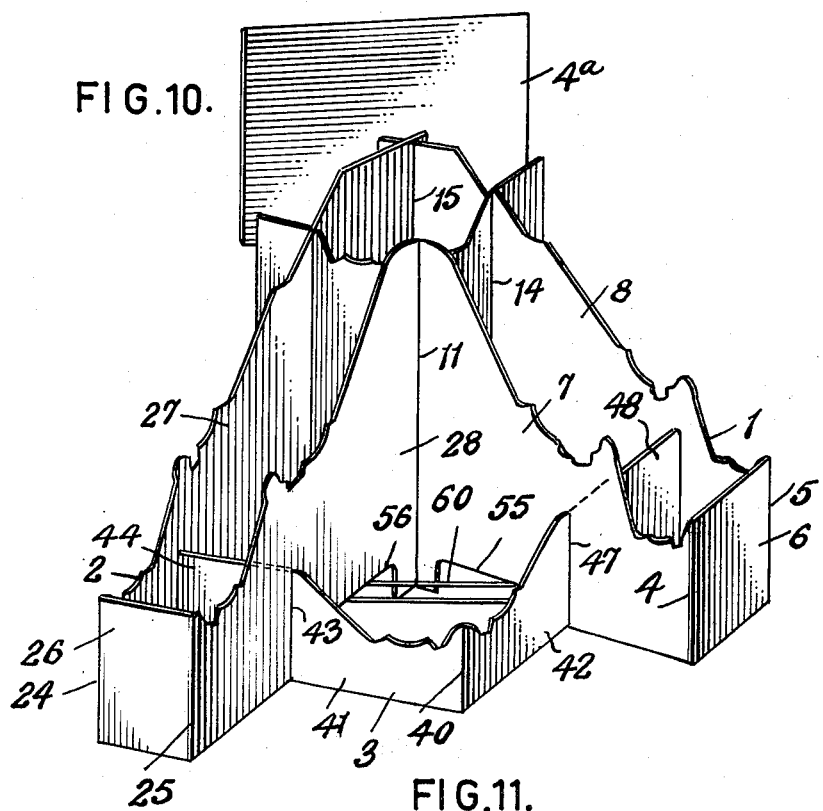
INVENTOR:
OTTO P. STORCH

United States Patent Office 2,936,079
Patented May 10, 1960

2,936,079
KNOCK-DOWN PARALLELOGRAMMIC DISPLAY DEVICE

Otto P. Storch, Elmhurst, N.Y., assignor to Einson-Freeman Co., Inc., Long Island City, N.Y., a corporation of New Jersey Application August 7, 1959, Serial No. 832,247

10 Claims. (Cl. 211—177)

This invention relates generally to display devices and has particular reference to a type of knock-down display which can be used on counters or at other locations in stores, for holding and displaying merchandise in an attractive and useful manner.

It is an object of the invention to provide a display device which can be fully assembled at the place of manufacture; which can be constructed of inexpensive sheet stock such as cardboard and handled and shipped in flattened or collapsed condition; and which, when received by the user, will be self-erecting.

Many display devices in use at the present time are furnished to the user in such condition that he is required to fit the parts together, often by time-consuming tongue and slot connections. The busy storekeeper often finds this task objectionable and as a result many of these devices remain in the store unassembled and unused.

To obviate the above objection, the present device contemplates the provision of a structure so arranged that the device will be self-erecting and to place it in service merely requires its placement at the point of display.

It is an objective of this invention to provide a display device in the form of a parallelogrammic structure which may be readily collapsed by pressure to increase the obliquity of the parallelogram, and which is constantly urged to spring into a fully set-up condition by means of a resilient means such as an elastic band. Thus, while the device may be shipped and stored in flattened condition it will immediately assume a serviceable ready-to-use state when it is placed at the point of display and allowed to expand.

Among the special features of the invention are (a) the structure and mode of cooperation of the relatively few elements of which the structure is composed, (b) the manner in which a simple elastic band may be employed to control the setting-up of the structure, and (c) the provision of a special diagonal stop panel or part which limits the movements of the several parts as they tend to assume the set-up condition.

One way of achieving these objects, and such other advantages as may hereinafter appear, is illustrated in the accompanying drawings, in which—

Fig. 5 is a front view of the display device in its flattened or collapsed condition;

Fig. 6 is a side view, from the right of Fig. 7, on a reduced scale, of the display device in its erected condition;

Fig. 7 is a front elevational view of the erected display device;

Fig. 8 is a view looking at the bottom of the display device;

Fig. 9 is a perspective view of the quadrilateral connection piece by itself, in the expanded condition it assumes when in place in the erected display device;

Fig. 10 is a perspective view of the display device as it appears ready for use; and Fig. 11 is a top plan view of the display device.

Figure 1:
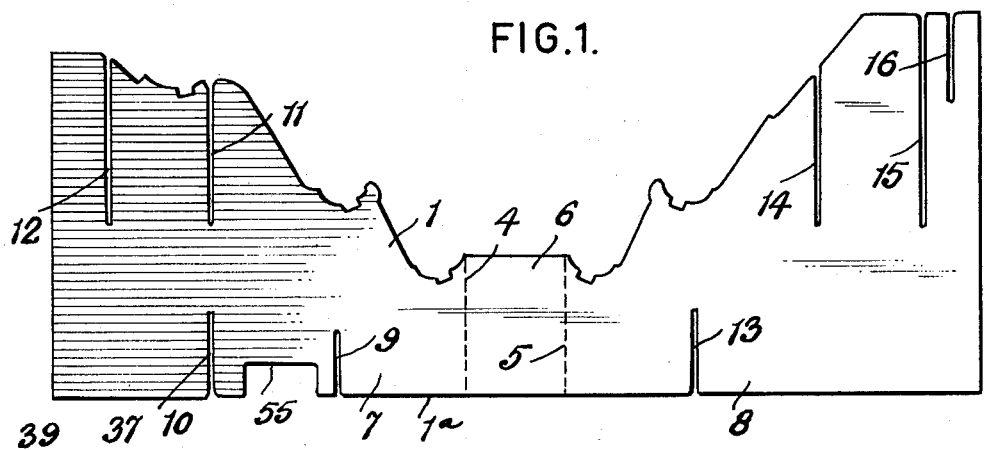
Fig. 1 is a face view of one of the elements of the display device in its original blank formation.
Figure 2:
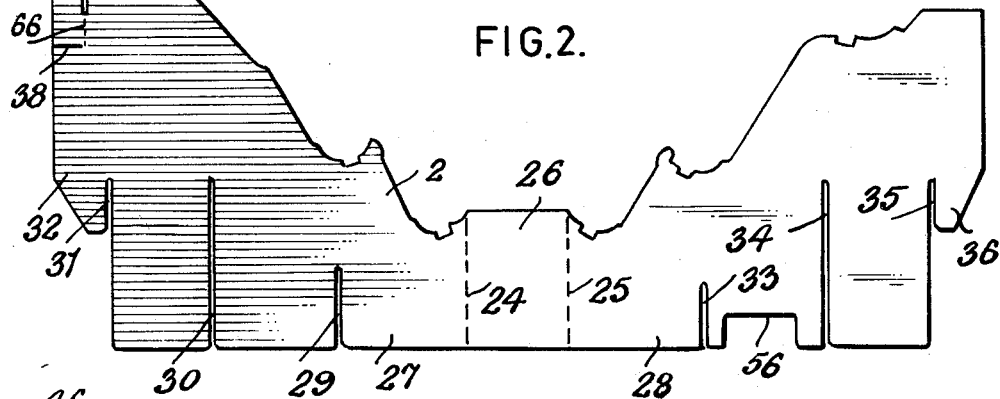
Fig. 2 is a similar view of a companion element.
Figure 3:
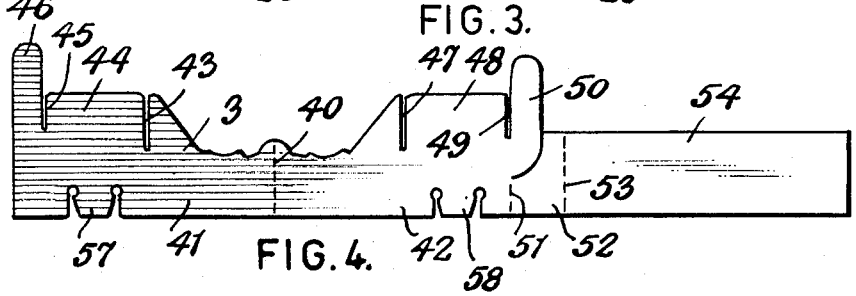
Fig. 3 is a similar view of the connection piece.
Figure 4:
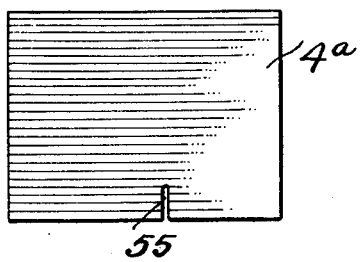
Fig. 4 is a face view of the sign card or placard.

The improved device is primarily composed of four elements, namely, the lengthy strips shown respectively at 1 and 2 in Figs. 1 and 2; the connection piece or bridge 3, shown in Figs. 3 and 9, and the display sign or placard 4a. The only additional element required for the device is an elastic member 60.

All of the elements 1, 2, 3 and 4a may be composed of inexpensive sheet material such as cardboard. The lengthy strip shown at 1, which forms one of the wings or U-shaped panels of the structure, is provided adjacent to its center with transversely-extending spaced parallel score lines 4 and 5 on which the strip is folded, and which define a front wall 6 between them. When the strip is folded on the score lines 4 and 5, it forms a three-sided generally U-shaped structure having spaced parallel side walls 7 and 8, and a front wall 6 located between the side walls and hingedly connecting the forward ends of said side walls.

The lower edge of the strip is indicated at 1a. Extending upwardly therefrom in the side wall 7 is a pair of slots 9 and 10. Also extending upwardly from said lower edge 1a is a slot 13, the latter slot being located in the side wall 8. Extending downwardly from the upper edge of the side wall 7 are the parallel slots 11 and 12. Similar slots 14 and 15 are formed in the side wall 8. Side wall 8 is also provided near its free end with a shorter, downwardly-extending slot 16.

The lengthy strip 2 is somewhat similar to the strip 1 and when folded it forms the second wing or U-shaped panel of the device. Strip 2 is provided with two transversely-extending spaced parallel score lines 24 and 25 on which the strip is folded and which define a front wall 26 between them. The side wall 27 has spaced parallel slots 29 and 30 extending upwardly from its lower edge, while similar slots 33 and 34 are formed in the side wall 28. It will be noted that the lower edge 1a of the strip 1 is formed with a notch 55, located between the slots 9 and 10. A similar notch 56 is formed in the lower edge of the side wall 28 between the slots 33 and 34. These notches 55 and 56 provide clearance for the elastic member 60 when the structure is fully assembled.

Near its free end, the side wall 28 is slotted at 35, providing a tab 36. Near the free end of the side wall 27 is a slot 31 providing a similar tab 32. The upper end of tab 32 is formed with a downwardly-extending slot 37 and a slit 38, the slit extending inwardly from the edge of the tab 32 and forming a tongue 39 which, when folded on the line 66, can ultimately be attached to the back of the display card or placard 4a by suitable fasteners, such as staples 62 (Fig. 6) to thereby attach the card 4a to the device and maintain it in an upstanding display position at the back of the device as shown in Figs. 5, 7 and 10.

In assembling the device, the two strips 1 and 2 are folded on the score lines 4, 5, 24 and 25 and the two three-walled enclosures thus formed are interengaged. That is to say, slot 14 engages with slot 35; slot 15 engages with slot 31; slot 11 engages with slot 34; and slot 12 engages with slot 30. The interengagement of the various slots as above described holds the walls of the U-shaped parts together in a parallelogrammic relation. The structure thus produced is reinforced by a connection piece shown in Fig. 3 and generally indicated at 3.

The connection piece 3 consists of a cardboard strip provided with a transverse score line 40 on which it is folded to provide a pair of legs 41 and 42 extending divergently rearward from the score line 40. The leg 42 is slotted downwardly from its top edge, as indicated at 47 and 49, providing an area 48 between these slots which forms a sort of partition in the space between the walls 7 and 8. Similarly, the leg 41 is slotted as shown at 43 and 45 to provide an area 44 between these slots which forms a partition in the space between the walls 27 and 28. A locking tongue 46 is located beyond slot 45 and a similar tongue 50 is positioned beyond the slot 49.

At 54 is shown a brace member which also forms a stop. It constitutes an integral extension of the leg 42. When the strip 3 is folded on the score lines indicated at 40, 51 and 53, a quadrilateral structure, clearly disclosed in Figs. 8, 9 and 11, is the result. Located between the score lines 51 and 53 is a web 52 which, when the connection piece is in place, is disposed flatly against the inside face of the side wall 8 near its lower end and is secured thereto in any suitable manner as by an adhesive or by the staple 61 (Figs. 6 and 11).

The connection member 3 is placed in position by the engagement of its slot 49 with slot 13 of the side wall 8 and by the engagement of slot 47 with slot 9. Similarly, slot 45 engages with slot 29, while slot 43 engages with slot 33. When the connection member is arranged as above described and secured at 61 to the lower portion of the side wall 8 as shown in Fig. 11, the brace member 54, forming a part of the strip 3, extends diagonally across the structure from its point of integral connection at 53 to the point where slot 45 engages with slot 29.

By way of further elucidating the manner of interengagement between the U-shaped strip 1 (Fig. 1), the U-shaped strip 2 (Fig. 2), and the connection piece 3 (Fig. 3), attention is directed to Figs. 8 and 11.

From Fig. 11 (a view from above) and also from Fig. 8 (a view from below), it will be noted that as the side wall 7 extends rearwardly from the front edge 4 it intersects, in succession, the leg 42 of piece 3, the side wall 28 of strip 2, and the side wall 27 of strip 2. Slot 9 in wall 7, cooperating with slot 47 in leg 42, allows intersection with leg 42; slot 11 in wall 7, cooperating with slot 34 in wall 28, allows intersection with wall 28; and slot 12 in wall 7, cooperating with slot 30 in wall 27, allows intersection with wall 27.

Along the line at which wall 7 intersects wall 28, it must also allow free passage through it of the brace member 54. Slot 10 in wall 7 provides this opening for brace member 54.

Similarly tracing side wall 28 of strip 2 rearwardly from the front edge 25, it will be noted that it intersects, in succession, leg 41 of piece 3, wall 7 of strip 1, and wall 8 of strip 1. The first intersection is made by cooperation of slot 33 in wall 28 with slot 43 in leg 41; the second intersection is made by cooperation of slot 34 in wall 28 with slot 11 in wall 7; and the third intersection is made by cooperation of slot 35 in wall 28 with slot 14 in wall 8.

Where the brace member 54 passes through slot 10 in wall 7, it also passes through the lower end of slot 34 in wall 28, slots 10 and 34 being in substantial coincidence.

At 60 (Figs. 8, 9, 10, 11) is shown a resilient tensioning device which can be in the form of an elastic band engaged around a tab 57 on the leg 41 of the connection piece 3 and also around a similar tab 58 provided on the leg 42. The notches 55 and 56 provide clearance for the looped elastic band as it passes from tab 57 to tab 58. The force exerted by the band 60 tends to draw the legs 41 and 42 toward one another to the extent permitted by the brace member 54 which forms a stop to limit the movement of the legs 41 and 42 when the structure reaches the desired set-up condition. The band 60 serves not only to automatically set up or erect the device, but to retain it in such condition substantially as shown in Figs. 7 and 10.

The device in the condition in which it is handled and shipped and provided to the user is shown in Fig. 5. It will be therein noted that all of the parts have been interfitted and the cross member or connection piece attached and that the parts are in flattened condition to cause the device to lie flatly. The elastic band 60 is at this time in its maximum expanded condition. By very slight finger pressure imposed at the points indicated at 5 and 24 in Fig. 5, the elastic band will be brought into action and will be caused to exert sufficient force to draw the legs 41 and 42 toward each other and cause the side walls 7, 8, 27 and 28 to be spread apart to bring the device into the erected or set-up condition shown in Fig. 10.

The upper edges of the several walls may be contoured in various ways to support articles to be displayed. For example, in Fig. 10 it will be observed that the upper edges of the parallel walls 27, 28 are configured to define a pair of rearwardly inclined cradles, one above the other, upon which articles may be supported. The parallel walls 7, 8 are similarly configured along their upper edges. It will also be noted that the upper edges of the forwardly converging legs 41, 42 can be shaped to support an article. Depending upon the size and character of the article, in each case, the upper edges of the walls may be appropriately contoured.

It will be apparent from the foregoing that the device is so constructed that all assembly work on it can be done by the manufacturer and the device delivered to the user in the flattened but otherwise complete condition shown in Fig. 5. Thus, the fitting together or assembly of parts of the device by the user is completely eliminated and the device will almost automatically spring into erected condition upon being placed upon a flat supporting surface such as a store counter. It is essentially a parallelogrammic structure in which one set of parallel upstanding walls (8, 7, 41) is interengaged at an angle to a second set of parallel upstanding walls (27, 28, 42), the walls being slotted at the intersections to afford hinged connections allowing the obliquity of the parallelogram to be altered.

The device can be provided with a display card or advertising placard, such as shown at 4a, which can stand erect behind the device and is supported thereby. The card shown at 4a is attached to the device by means of the tab 39 secured by the staples 62 to the card. Provided in the card 4a is a slot 55 engaging with the slot 57. To stabilize the card 4a and cooperate with the tab 39 in supporting it, the card can be entered into the slot 16. The card remains attached to the device whether the device is in the flattened condition shown in Fig. 5 or in is erected state.

The device can obviously be employed for a variety of purposes; for example it may display or store merchandise items or it may bear advertising indicia, or both. The number of upstanding walls and the contours of their upper edges may obviously be altered to suit requirements. In general, it will be understood that the details herein described merely by way of example may be modified in numerous respects without necessarily departing from the spirit and scope of the invention as expressed in the appended claims.

What is claimed is:

1. A display device comprising a pair of U-shaped panels each consisting of a folded strip having parallel side walls and an intervening front wall hingedly connected thereto, the side walls of one of said panels intersecting the side walls of the other panel adjacent to the rear open ends of the U's, said side walls being slotted for hinged interengagement of the intersecting walls, a connection piece having rearwardly divergent legs intersecting said U-shaped panels adjacent to the front closed ends of the U's, the intersecting legs and panel walls being slotted to afford hinged interengagement, a part of said connection piece being hinged to the free end of one leg and secured to one of said side walls, another part of said connection piece being a free-end brace extending between said legs, and elastic means extending between said legs and exerting a force tending to draw them toward each other.

2. A display device comprising a pair of folded strips each having spaced side walls and an integral front wall connecting the side walls, the strips being positioned to cross one another at the rear, the side walls being slotted to interfit at the points of crossing, a connection piece having legs extending angularly and across the side walls of the strips, a diagonal brace member formed integrally with the connection piece, and resisient means extending between said legs and tending to draw them toward each other.

3. A display device as defined in claim 2, wherein the brace member is fastened at one of its ends to one of the side walls of one of said strips, the legs being notched to provide tabs, and the resilient means being in the form of an elastic band extending around the tabs and forming a loop extending between the legs.

4. A display device comprising a pair of lengthy cardboard strips folded into substantially U-shaped and interfitted to retain them in interengaged parallelogrammic relationship, each of the strips being so folded as to define a pair of spaced parallel side walls connected at one end by a front wall, the side walls of each strip being slotted for engagement with parts of the side walls of the companion strip to thereby retain the side walls in crossed relation, a connection piece consisting of a folded strip having legs engaging the side walls of both strips, portions of the connection piece bridging the spaces between the side walls and forming vertical partitions therebetween, and spring means operative to hold the device in set-up condition with the walls of the strips in spaced relation but permitting the strips and the connection piece to be flattened against one another by an increase in the obliquity of the parallelogrammic relationship.

5. A display device comprising a pair of folded strips having parallel spaced-apart side walls and a front wall extending between them, the strips being positioned in intersecting relation to each other and slotted to interfit at the points of crossing, a connection piece having angularly-extending legs extending between the strips and provided with portions forming partitions between said side walls, the connection piece being slotted to engage with said side walls at the points of crossing, the strips and the connection piece being foldable to lie in flattened relation, and an elastic member extended between the legs of the connection piece and tending to draw them toward each other to position the strips in an erected parallelogrammic structure.

6. A display device comprising a pair of three-walled strips disposed in intersecting relation to each other, said strips having their walls slotted for interengagement at the points of crossing, a collapsible quadrilateral connection piece extending between the strips, and an elastic member extending between parts of the connection piece for yieldably maintaining the same in its expanded angularity.

7. A display device as defined in claim 6, wherein the connection piece includes a free-end brace portion extending from one of the walls of one of the strips to a wall of the other strip and serving as a diagonal stop to limit movement toward one another of the parts of the connection piece to which the elastic member is connected.

8. A display device comprising a pair of folded strips having spaced, parallel side walls and a front wall extending between them, the strips being positioned at an angle to each other and having rear portions of their side walls in intersection, the intersecting parts being slotted at the points of crossing, a connection piece having a pair of diverging legs extending between the strips and crossing the walls thereof and provided with portions fitted between said walls and forming partitions, the connection piece being slotted to engage with the side walls at points where it crosses them, the strips and the connection piece being foldable for disposition in flattened overlying relation, and an elastic member operative on the connection piece and tending to draw the legs toward each other to bring the strips from flattened to open erected position.

9. A display device comprising a pair of strips folded upon themselves so that each forms a compartment defined by side walls and a front wall, the strips being positioned at an angle to each other with rear portions of the side walls of one of the strips intersecting similar portions of the side walls of the other strip, the side walls of the strips being slotted for interengagement at the points of intersection, a connection piece of quadrilateral form having a leg extending between the side walls of one of the strips and forming a partition in the compartment formed by said strip, the connection piece having a second leg extending between the side walls of the second strip and forming a partition in the compartment formed by said second strip, an elastic member having one end secured to one of the partition-forming parts of the connection piece and having a second end secured to the second partition-forming part of said piece, the elastic member being under tension between its points of attachment, said connection piece including a brace member extending between one of the side walls of one of the strips to a side wall on the other strip and acting as a stop to limit the force exerted by the elastic member.

10. A collapsible display device comprising a first set of parallel upright walls, a second set of parallel upright walls intersecting the first set to form a parallelogrammic structure, said walls being slotted at the intersections to afford a hinged relationship which permits collapse of the structure by an increase in the obliquity of the parallelograms, elastic means extending diagonally betweeen a wall of one set and a wall of the other to draw the structure into set-up condition, and a stop extending along a diagonal of the parallelogrammic structure to limit the movements of the walls toward set-up condition.

References Cited in the file of this patent
UNITED STATES PATENTS

| | | |
|---|---|---|
| 890,135 | Gilliland | June 9, 1908 |
| 1,052,187 | Stranders | Feb. 4, 1913 |
| 1,959,619 | Ebert | May 22, 1934 |